3,681,253
COMPOSITION AND METHOD OF STABILIZING FOAM
Ralph P. Arthur, Parkersburg, and M. Joanne Belden, Washington, W. Va., assignors to Borg-Warner Corporation, Chicago, Ill.
No Drawing. Filed Apr. 26, 1968, Ser. No. 724,595
Int. Cl. B01j 13/00; C11d 9/22
U.S. Cl. 252—307                                                 1 Claim

ABSTRACT OF THE DISCLOSURE

A method of increasing and stabilizing foam by adding a maleic anhydride-conjugated diene copolymer or salt thereof to a foam forming composition prior to formation of the foam.

BACKGROUND

Prior to this invention, a great many additives such as alkanolamides and fatty amine oxides have been added to high foaming alkyl-aryl sulfonates and alcohol sulfate salts to boost and stabilize foam forming compositions. The foams thus formed were not sufficiently stable to retain their volume over an extended period of time.

The efficiency of a foam stabilizer is measured by the amount of foam that is generated in its presence and its effect on the tendency of the foam to collapse over a given period of time. The amount of foam that is produced and its tendency to collapse has bearing upon the use of a given foam stabilizer in a variety of applications such as detergent compositions, i.e., liquid dish washing detergents, shampoos, shaving cream products, etc., commercial applications, e.g., foamed plastics, foamed gypsum products such as wallboard, foamed concrete, air foam drilling, cleaning compositions, pickling and cleaning for trapping noxious gases, for fire fighting compositions and the like.

SUMMARY OF THE INVENTION

Briefly described, this invention is a method of stabilizing foamable compositions such as detergent compositions, surfactants, gypsum products, concrete, etc. by adding thereto a small portion, i.e., from about 0.1 percent to about 5 percent of a maleic anhydride-conjugated diene copolymer or salt thereof to cause the foam composition to retain its stability and volume for an extended period of time.

The preferred conjugated dienes that may be copolymerized with maleic anhydride to form the copolymer or salt thereof are butadiene and isoprene. Other conjugated diolefins that may be utilized are 2-chloro-1,3-butadiene; 2,3 -dichlorobutadiene; 2,3 - dimethylbutadiene; piperylene; 2,4 - hexadiene; 2 - methyl - 1,3-pentadiene; 2-ethyl-1,3 - butadiene; 2 - propyl - 1,3 - butadiene; 2 - phenyl-1,3 - butadiene; 3 - methyl - 1,3 - pentadiene; 2 - ethyl-1,3 - pentadiene; 2 - methyl - 1,3 - hexadiene; 1-methoxy-1,3-butadiene, etc.

The reaction to form the copolymer may be carried out by placing the maleic anhydric in any organic solvent in which the conjugated diene or dienes are soluble and which is inert towards maleic anhydride and adding the diene and catalyst thereto. Any solvents which do not contain reactive hydrogen atoms such as alcohols, mercaptans or amines are suitable solvents. The conjugated diene and catalyst are preferably added over the total reaction time. Suitable solvents include ketones, esters, ethers, as for example, acetone, methyl ethyl ketone, cyclohexanone, ethyl acetate, butyl acetate, dioxane, tetrahydrofuran, dipropyl ether, dibutyl ether, dimethyl ether of ethylene glycol or dimethyl ether of diethylene glycol. The above polar solvents are generally preferred since they are usually solvents for the copolymer as well as the monomers, and maintain a homogeneous phase throughout the reaction period.

The salt of the polymer is prepared by reacting an organic or inorganic base with the acid or, in some cases, the anhydride form of the polymer. The preferred bases utilized to prepare the salt are alkali metal hydroxides, e.g., sodium or potassium hydroxide, ammonium hydroxide or anhydrous ammonia and amines, e.g., alkanolamines. Partial salts (e.g., when 10–100 percent of a stoichiometric amount of base is added to the acid form of the polymer) are also useful as foam stabilizing agents in this invention. The foam stabilizing additives of this invention may also be prepared by adding the acid or anhydride form of the maleic anhydride-diene polymer to a detergent or surfactant composition that contains basic salts.

The specific detergents that may incorporate the additives of this invention for foam stabilization may include such compounds as alkyl arylsulfonates, alkyl ethylene oxide ether sulfates, alkyl sulfates and ethoxylated alcohol sulfates. However, the detergents are relatively unimportant and the invention is not limited to any given detergent.

The foam boosters of this invention are useful in a variety of applications, such as dish-washing detergent concentrates, shaving cream products, foaming of beverages such as beer, foamed plastics, foamed rubbers, foamed gypsum products such as wallboard, foamed concrete, ore flotation processes, air foam drilling, petroleum secondary recovery operations, sealing of underground storage chambers for gas, cleaning compositions, pickling and cleaning operations, trapping of noxious gases, fire fighting compositions and the like.

As an example of the preparation of the copolymer additive of this invention, i.e., a maleic anhydride-butadiene copolymer was prepared as follows. 0.153 mole, 15 g. of maleic anhydride was placed in a 100 ml. three-necked reaction vessel equipped with a magnetic stirrer, gas inlet tube, condenser and thermometer along with 13 ml. of peroxide-free dioxane. .25 g. of benzoyl peroxide were added to the reaction vessel. After stirring five minutes, 0.153 mole, 7.7 g. of butadiene were added by distillation through a tube placed beneath the surface. After an induction period of eight minutes, the composition exothermed vigorously and an increase in viscosity was noted. The maleic anhydride-butadiene copolymer (2 g.) was isolated by precipitation with benzene. The copolymer softened at approximately 140° C. and was soluble in dimethyl formamide and acetone. The product was hydrolyzed and reacted with a stoichiometric amount of ammonium hydroxide to form the ammonium salt.

The evaluation of the copolymer or a salt thereof as a foam stabilizer, was determined by the height of the foam and the ability of the stabilizer to retain the foam form over a given period of time. In demonstrating the usefulness of the foam stabilizers used in the method of this invention, maleic anhydride-conjugated diene copolymers were prepared and added to various dish washing compositions. In Examples 1 through 4 in Table 1 below, the additives of this invention were compared with alkanolamide as a foam stabilizer and were foamed as set forth in Table 2.

TABLE 1

| Example | Controls | | | | |
|---|---|---|---|---|---|
| | 1 | 2 | 3 | 4 | 5 |
| Sodium salt of linear alkylbenzenesulfonic acid (60% active), g | 80 | 80 | 80 | 400 | 400 |
| Ammonium salt of ethoxylated alcohol sulfate (60% active), g | 50 | 50 | 50 | 250 | 250 |
| Sodium xylenesulfonate (40% active), g | 14 | 14 | 14 | 70 | 70 |
| Demineralized water, g | 50 | 50 | 50 | 250 | 250 |
| Ammonium salt of hydrolyzed maleic anhydride-butadiene copolymer (I.V. 0.38 [1]), g | | | 0.43 ([2] 0.5%) | 3.8 ([2] 0.9%) | 7.6 ([2] 1.8%) |
| Lauric acid alkanolamide, g | 0.5 ([2] 0.6%) | 6 ([2] 6.7%) | | | |

[1] Inherent viscosity.  [2] Percent of total solids.

In Table 2, .25 g. of each liquid of the examples of Table 1 were placed in a 600 ml. beaker containing 100 ml. of water of 200 parts per million hardness. Each was whipped for exactly thirty seconds using a Hamilton Beach Mixer. The foamed liquid was poured into a 500 ml. graduated cylinder and the foam height measured in centimeters at given time intervals.

TABLE 2

| Example | 1 | 2 | 3 | 4 | 5 |
|---|---|---|---|---|---|
| Initial height, cm | 16.5 | 30.5 | 28.3 | 28.6 | 23.6 |
| Height after— | | | | | |
| 5 min., cm | 11.0 | 28.5 | 26.5 | 26.7 | 22.8 |
| 10 min., cm | 9.5 | 26.0 | 24.2 | 25.5 | 23.4 |
| 30 min., cm | 7.8 | 23.6 | 22.8 | 23.4 | 23.5 |

From the data in Tables 1 and 2, it will be noted that a substantially lower percentage (.4 to 1.0 percent of total solids) of the foam boosters of this invention produce foam boosting essentially equivalent to that of much higher percentages (about 6 percent of total solids) of a standard foam booster. It is also shown that the same percentages of alkanolamides are relatively ineffective. A standard method of measuring foam boosting is the Ross-Miles Foam Test (ASTM D1173–53 (1965)). In Table 3 below, there is shown a comparison by Ross-Miles test data of the foam boosters of this invention with the standard alkanolamide foam boosters.

The Ross-Miles foam data of Table 3 illustrate that about one percent (of total solids) of the foam boosters of this invention is as effective as 6–7 percent (of total solids) of the standard alkanolamides foam booster. Also, the low concentrations of the instant foam boosters are as effective as the popular liquid detergent sold under the trade name of "Joy."

Dish washing detergent compositions containing the foam boosters of this invention are compared with commercial dish washing preparations with standard dish washing tests, in Table 4 below. In each case, 12 inch dinner plates were soiled with 5 grams of a standard greasy soil. The dish washing medium was made up of 1¾ gallons of 200 parts per million water at 53° C. and the indicated amount of formulated detergent (based on solids content of detergent formulation) was added thereto.

TABLE 4.—DISH WASHING TESTS

| Method of testing | Commercial | Formulation of this invention | Concentration of detergent in medium, percent | Hardness of water, p.p.m. | Number of plates possible to wash |
|---|---|---|---|---|---|
| American Hotel Association Method | | Example 4, Table 1 | 0.075 | 200 | 17 |
| Do | "Joy" | | 0.075 | 200 | 14 |
| Do | "Joy" | | 0.1 | 50 | 14 |
| Do | | Example 4, Table 1 | 0.1 | 50 | 13 |
| Do | "Chiffon" | | 0.15 | 200 | 23 |
| Do | | Example 4, Table 1 | 0.15 | 200 | 23 |
| Do | | Example 5, Table 1 | 0.15 | 200 | 23 |

NOTE.—In each of the seven examples above, the American Hotel Association Test was used wherein the designated amount of detergent was used to clean 5 grams of soil from the indicated amount of dinner plates. The test may be used as set forth in 1965–66 Workbook of Test Method and Standards for the Certified Products Program of the Institute Research Council, American Hotel and Motel Association, Specification 1.4.2.

The testing reported in Table 4 shows that dish washing formulations using the foam boosters of this invention are equal to or superior to the dish washing formulations in the trade. Again it should be emphasized that commercial formulations customarily contain as foam booster an amount of alkanolamide or amine oxide of the order of 6 percent of total solids.

TABLE 3
Ross-Miles Foam Data [ASTM D1173–53 (1965)]

| Example | Controls | | | | 10 | 11 | 12 | 13 | 14 | 15 | 16 |
|---|---|---|---|---|---|---|---|---|---|---|---|
| | 6 | 7 | 8 | 9 | | | | | | | |
| 3A formulations: | | | | | | | | | | | |
| Joy [1], g | [2] .83 | | | | | | | | | | |
| Sodium salt of linear alkylbenzenesulfonic acid (60% active), g | | [2] .58 | | | 400 | 100 | | | 400 | 400 | 400 |
| Ammonium salt of ethoxylated alcohol sulfate (60% active), g | | | [2] .58 | | 250 | | 100 | | 250 | 250 | 250 |
| Ammonium salt of alcohol sulfate (30% active), g | | | | | | | | 200 | | | |
| Sodium xylenesulfonate (40% active), g | | | | [2] .88 | 70 | | | | 70 | 70 | 70 |
| Demineralized water, g | | | | | 250 | 400 | 400 | 300 | 250 | 250 | 250 |
| Partial ammonium salt of hydrolyxed butadiene-maleic anhydride copolymer (I.V. 28), g | | | | | | | | | {4.1 ([3] 0.97%)} | | |
| Ammonium salt of hydrolyzed butadiene-maleic anhydride copolymer (I.V. 28), g | | | | | | | | | | {4.1 ([3] 0.97%)} | |
| Ammonium salt of hydrolyzed butadiene-maleic anhydride copolymer (I.V. 38), g | | | | | {0.64 ([3] 1.05%)} | {0.64 ([3] 1.05%)} | {0.64 ([3] 1.05%)} | | | | {4.1 ([3] 0.97%)} |
| Lauric acid alkanolamide (standard), g | | | | {30 ([3] 6.7%)} | | | | | | | |
| 3B formulations: [4] | | | | | | | | | | | |
| Initial foam height, cm | 19.5 | 19.0 | 17.0 | 16.0 | 21.0 | 21.5 | 19.3 | 21.5 | 20.8 | 19.5 | 20.0 |
| Foam height after 5 min., cm | 19.5 | 15.0 | 14.0 | 13.0 | 20.0 | 21.0 | 19.0 | 21.1 | 20.0 | 19.0 | 19.3 |

[1] A commercial dishwashing formulation in grams.
[2] These concentrates each contained .35 g. solids and were compared as controls with the compositions of this invention in 3B below.
[3] Percent of total solids.
[4] Ross-miles foam height test: 0.35 g. solids in 300 ml. of 200 p.p.m. water at 49° C.

It will be understood by those skilled in the art that the examples are by way of illustration and not by way of limitation. The scope of the invention is defined solely by the appended claim which should be construed as broadly as is consistent with the prior art.

What is claimed is:

1. A method of increasing and stabilizing foam products prepared from foam-forming compositions which comprises the step of adding to said foam-forming composition from about 0.1% to about 5% by weight of a material selected from the group consisting of maleic-anhydride conjugated diene copolymer, the free acid derived therefrom and water soluble salts of the free acid.

References Cited

UNITED STATES PATENTS

| | | | |
|---|---|---|---|
| 2,142,980 | 1/1939 | Huijser et al. | 260—78.5 BU |
| 2,640,039 | 5/1953 | Williams | 260—785 BU |
| 2,327,302 | 8/1943 | Dittmar | 252—132 |
| 3,308,067 | 3/1967 | Diehl | 252—152 |
| 3,385,834 | 5/1968 | Merijan | 252—307 |

JOHN D. WELSH, Primary Examiner

U.S. Cl. X.R.

252—132, 351, 180